United States Patent
Chatterjee (10) Patent No.: US 8,478,299 B2
(45) Date of Patent: Jul. 2, 2013

(54) SYSTEM AND METHODS FOR OBTAINING COARSE LOCATION FOR A MOBILE DEVICE

(75) Inventor: Manjirnath Chatterjee, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 858 days.

(21) Appl. No.: 12/098,406

(22) Filed: Apr. 4, 2008

(65) Prior Publication Data

US 2008/0248813 A1    Oct. 9, 2008

Related U.S. Application Data

(60) Provisional application No. 60/910,632, filed on Apr. 6, 2007.

(51) Int. Cl.
  *H04W 24/00*  (2009.01)
(52) U.S. Cl.
  USPC ........................................ 455/456.2; 455/434
(58) Field of Classification Search
  USPC ............. 455/456, 404.1–404.2, 414.1, 422.1, 455/434, 456.1–457; 701/200
  See application file for complete search history.

(56) References Cited

U.S. PATENT DOCUMENTS

| | | | |
|---|---|---|---|
| 5,020,090 A | 5/1991 | Morris | |
| 5,105,184 A | 4/1992 | Pirani et al. | |
| 5,297,142 A | 3/1994 | Paggeot et al. | |
| 5,403,639 A | 4/1995 | Belsan et al. | |
| 5,625,673 A | 4/1997 | Grewe et al. | |
| 5,664,228 A | 9/1997 | Mital | |
| 5,724,655 A | 3/1998 | Grube et al. | |
| 5,727,159 A | 3/1998 | Kikinis | |
| 5,797,089 A | 8/1998 | Nguyen | |
| 5,870,680 A | 2/1999 | Guerlin et al. | |
| 5,873,045 A | 2/1999 | Lee et al. | |
| 5,983,073 A | 11/1999 | Ditzik | |
| 6,034,321 A | 3/2000 | Jenkins | |

(Continued)

FOREIGN PATENT DOCUMENTS

| | | |
|---|---|---|
| EP | 1215575 A2 | 6/2002 |
| EP | 1330098 A1 | 7/2003 |
| WO | 9926159 A2 | 5/1999 |
| WO | 2009018277 A1 | 2/2009 |

OTHER PUBLICATIONS

Non-Final Office Action Mailed Jun. 11, 2010, U.S. Appl. No. 11/873,305, 21 pages.

(Continued)

*Primary Examiner* — Kashif Siddiqui (57) ABSTRACT

Various embodiments are described for obtaining coarse location for a mobile device. In one embodiment, a mobile device may comprise one or more interfaces for detecting location reference nodes in view of the mobile device and a client module to send a location query to a location database. The location query may comprise node data identifying the reference nodes in view of the mobile device. The location database may be configured to respond to the location query with positioning information for providing an estimated position of the mobile device. The positioning information may be based on correlated position data and node data received from one or more client devices having Global Positioning System (GPS) position determination capability and configured to report position data and node data for location reference nodes in view. Other embodiments are described and claimed.

26 Claims, 3 Drawing Sheets

U.S. PATENT DOCUMENTS

| | | | |
|---|---|---|---|
| 6,157,982 | A | 12/2000 | Deo et al. |
| 6,311,209 | B1 | 10/2001 | Olson et al. |
| 6,401,113 | B2 | 6/2002 | Lazaridis et al. |
| 6,546,262 | B1 | 4/2003 | Freadman |
| 6,577,877 | B1 | 6/2003 | Charlier et al. |
| 6,625,472 | B1 | 9/2003 | Farazmandnia et al. |
| 6,628,938 | B1 * | 9/2003 | Rachabathuni et al. ... 455/456.3 |
| 6,633,759 | B1 | 10/2003 | Kobayashi |
| 6,779,019 | B1 | 8/2004 | Mousseau et al. |
| 6,865,394 | B2 * | 3/2005 | Ogino et al. ............... 455/456.1 |
| 6,895,220 | B2 | 5/2005 | Usui |
| 6,947,975 | B2 | 9/2005 | Wong |
| 6,957,085 | B2 | 10/2005 | Shin et al. |
| 6,999,792 | B2 | 2/2006 | Warren |
| 7,013,112 | B2 | 3/2006 | Haller et al. |
| 7,047,038 | B1 | 5/2006 | Macor |
| 7,054,594 | B2 | 5/2006 | Bloch et al. |
| 7,383,061 | B1 | 6/2008 | Hawkins |
| 2001/0018349 | A1 * | 8/2001 | Kinnunen et al. ............ 455/456 |
| 2002/0151283 | A1 | 10/2002 | Pallakoff |
| 2004/0067773 | A1 * | 4/2004 | Rachabathuni et al. ...... 455/560 |
| 2004/0122774 | A1 | 6/2004 | Studd et al. |
| 2005/0027818 | A1 | 2/2005 | Friedman et al. |
| 2005/0038900 | A1 | 2/2005 | Krassner et al. |
| 2005/0197767 | A1 * | 9/2005 | Nortrup ........................ 701/209 |
| 2006/0168101 | A1 | 7/2006 | Mikhailov et al. |
| 2006/0184613 | A1 | 8/2006 | Stienessen et al. |
| 2006/0242278 | A1 | 10/2006 | Hawkins |
| 2007/0088490 | A1 * | 4/2007 | Sutardja ........................ 701/117 |
| 2007/0150186 | A1 * | 6/2007 | Ingulsrud ...................... 701/211 |
| 2007/0198698 | A1 | 8/2007 | Boyd et al. |
| 2007/0239884 | A1 | 10/2007 | Karmakar et al. |
| 2007/0250258 | A1 * | 10/2007 | Hager ........................... 701/201 |
| 2008/0034031 | A1 | 2/2008 | Weisbrot et al. |
| 2008/0098093 | A1 | 4/2008 | Simon et al. |
| 2008/0147671 | A1 | 6/2008 | Simon et al. |
| 2008/0248813 | A1 | 10/2008 | Chatterjee |
| 2008/0248834 | A1 | 10/2008 | Chatterjee et al. |
| 2008/0281798 | A1 | 11/2008 | Chatterjee et al. |
| 2009/0055749 | A1 | 2/2009 | Chatterjee et al. |
| 2010/0120422 | A1 * | 5/2010 | Cheung et al. ................. 455/434 |
| 2011/0199255 | A1 * | 8/2011 | Murray et al. ........... 342/357.23 |

OTHER PUBLICATIONS

PCT International Search Report and Written Opinion, Application No. PCT/US2006/014060, Published Sep. 1, 2006, 12 pages.

Dasgupta, S., et al, "A Movable User Interface Based on a Simple X-Window Like Protocol", Gas Authority of India Ltd., (3), Aug. 1991, pp. 199-203.

* cited by examiner

```
DETECT REFERENCE NODES IN VIEW OF A
MOBILE DEVICE
310
           │
           ▼
SEND A LOCATION QUERY TO A LOCATION
DATABASE
320
           │
           ▼
RECEIVE POSITIONING INFORMATION FOR
PROVIDING A COARSE LOCATION OF THE
MOBILE DEVICE
330
```

*FIG. 3*

SYSTEM AND METHODS FOR OBTAINING COARSE LOCATION FOR A MOBILE DEVICE

RELATED APPLICATIONS

This application claims priority to U.S. Provisional Patent Application Ser. No. 60/910,632, which was filed on Apr. 6, 2007. This application is also related and claims priority to U.S. patent application Ser. No. 11/612,282 titled "System for Running Web Applications Offline and Providing Access to Native Services," which was filed on Dec. 18, 2006 and U.S. patent application Ser. No. 11/873,305 titled "Offline Automated Proxy Cache for Web Applications," which was filed on Oct. 16, 2007. These applications are entirely incorporated by reference.

BACKGROUND

When a mobile device is attached to a mobile network, the cellular operator may know a coarse radius in which the mobile device is located based on the tower from which the mobile device is using to broadcast. The location of the tower generally is not available to the mobile device and varies greatly from operator to operator. While mobile devices may have extra communications capabilities such as the ability to communicate with Wi-Fi hotspots or Bluetooth® nodes, such nodes typically have no information associated with them to provide their location other than a service set identifier (SSID) name which may identify a particular business establishment.

DETAILED DESCRIPTION

Various embodiments are directed to obtaining coarse location for a mobile device. Numerous specific details are set forth to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
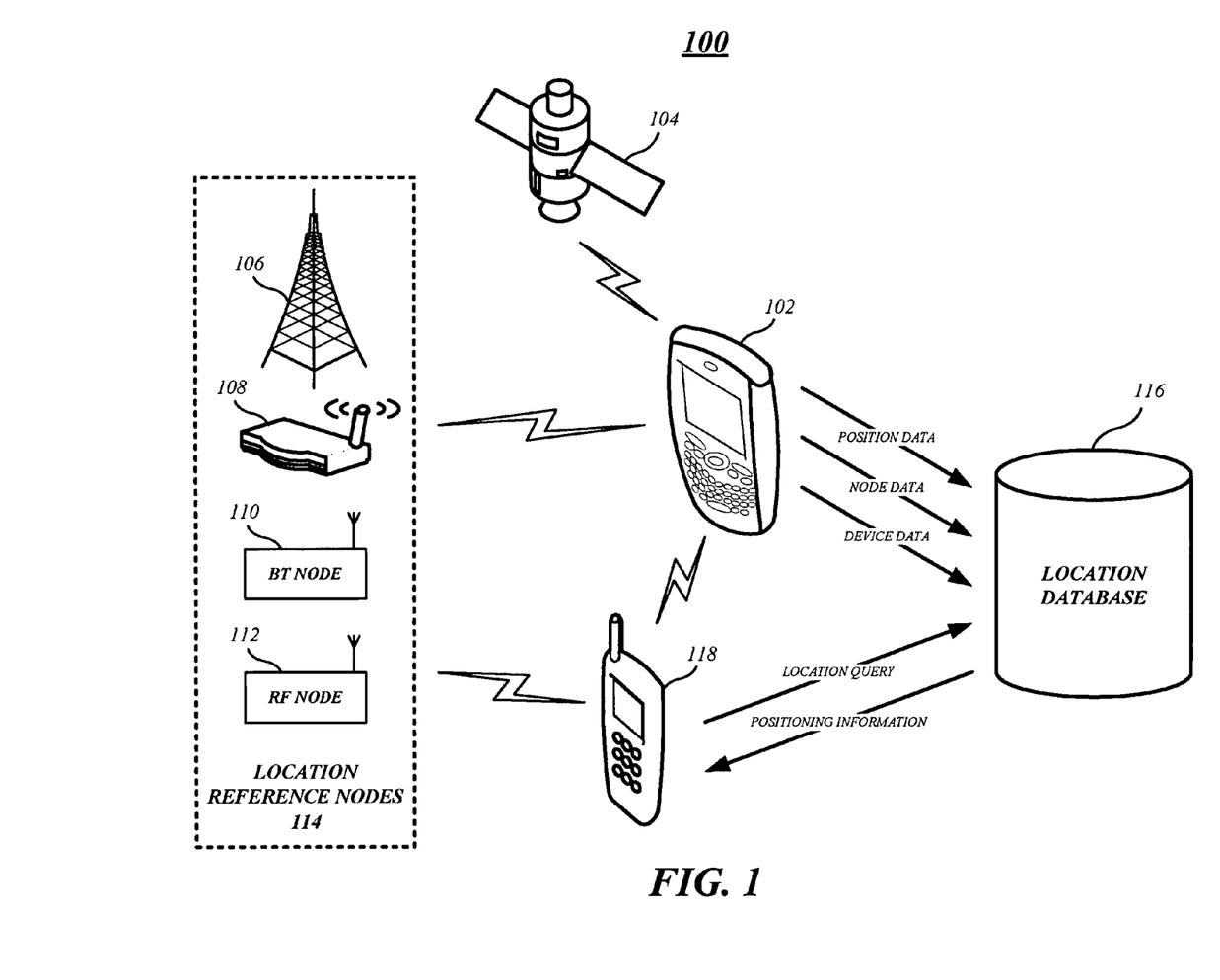
FIG. 1 illustrates one embodiment of a communications system.

FIG. 1 illustrates a communications system 100 suitable for implementing various embodiments. Although FIG. 1 depicts a limited number of elements for purposes of illustration, it can be appreciated that the communications system 100 may include more or less elements as well as other types of elements in accordance with the described embodiments. Elements of the communications system 100 may comprise physical or logical entities for communicating information implemented as hardware components (e.g., computing devices, processors, logic devices), executable computer program instructions (e.g., firmware, software) to be executed by various hardware components, or combination thereof, as desired for a given set of design parameters or performance constraints.

As shown, the communications system 100 may comprise a mobile device 102. In some embodiments, the mobile device 102 may be implemented as a combination handheld computer and mobile telephone, sometimes referred to as a smart phone. It can be appreciated that while certain embodiments may be described with the mobile device 102 implemented as a smart phone by way of example, the mobile device 102 may be implemented as other types of user equipment (UE) or wireless computing devices such as a mobile telephone, personal digital assistant (PDA), combination mobile telephone/PDA, handheld device, mobile unit, subscriber station, game device, messaging device, media player, pager, or other suitable mobile communications devices.

The mobile device 102 generally may be configured to support or provide cellular voice communication, wireless data communication, and computing capabilities in accordance with the described embodiments. The mobile device 102 may comprise various components for providing such capabilities including, for example, a printed circuit board (PCB), one or more processors (e.g., host processor, radio processor), one or more transceivers (e.g., voice communications transceiver, data communications transceiver, GPS transceiver), memory (e.g., volatile or non-volatile memory, removable or non-removable memory, erasable or non-erasable memory, writeable or re-writeable memory), internal and/or external antennas, a rechargeable battery, and others.

The mobile device 102 may provide voice and wireless data communications functionality by communicating with a mobile network such as a Code Division Multiple Access (CDMA) network, Global System for Mobile Communications (GSM) network, North American Digital Cellular (NADC) network, Time Division Multiple Access (TDMA) network, Extended-TDMA (E-TDMA) network, Narrowband Advanced Mobile Phone Service (NAMPS) network, third generation (3G) network such as a Wide-band CDMA (WCDMA) network, CDMA-2000 network, Universal Mobile Telephone System (UMTS) network, and others.

The mobile device 102 also may support wireless wide area network (WWAN) data communications services including Internet access. Examples of WWAN data communications services may include Evolution-Data Optimized or Evolution-Data only (EV-DO), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others.

The mobile device 102 may provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others.

The mobile device 102 also may be arranged to perform data communications functionality in accordance with shorter range wireless networks, such as a wireless personal area network (PAN) offering Bluetooth® data communications services in accordance with the Bluetooth® Special Interest Group (SIG) series of protocols, specifications, profiles, and so forth. Other examples of shorter range wireless networks may employ infrared (IR) techniques or near-field communication techniques and protocols, such as electromagnetic induction (EMI) techniques including passive or active radio-frequency identification (RFID) protocols and devices.

The mobile device 102 may comprise various radio elements, including a radio processor, one or more transceivers, amplifiers, filters, switches, and so forth to provide voice and/or data communication functionality. It may be appreciated that the mobile device 102 may operate in accordance with different types of wireless network systems utilize different radio elements to implement different communication techniques. The mobile device 102 also may comprise various input/output (I/O) interfaces for supporting different types of connections such as a serial connection port, an IR port, a Bluetooth® interface, a network interface, a Wi-Fi interface, a WiMax interface, a cellular network interface, a wireless network interface card (WNIC), a transceiver, and so forth.

The mobile device 102 may comprise one or more internal and/or external antennas to support operation in multiple frequency bands or sub-bands such as the 2.4 GHz range of the ISM frequency band for Wi-Fi and Bluetooth® communications, one or more of the 850 MHz, 900 MHZ, 1800 MHz, and 1900 MHz frequency bands for GSM, CDMA, TDMA, NAMPS, cellular, and/or PCS communications, the 2100 MHz frequency band for CDMA2000/EV-DO and/or WCDMA/JMTS communications, the 1575 MHz frequency band for Global Positioning System (GPS) operations, and others.

The mobile device 102 may comprise various software programs such as system programs and applications to provide computing capabilities in accordance with the described embodiments. Exemplary system programs may include, without limitation, an operating system (OS), device drivers, programming tools, utility programs, software libraries, application programming interfaces (APIs), and so forth. Exemplary operating systems may include, for example, a Palm OS®, Microsoft® OS, Unix® OS, Linux® OS, Symbian OS™, Embedix OS, Binary Run-time Environment for Wireless (BREW) OS, JavaOS, a Wireless Application Protocol (WAP) OS, and others.

The mobile device 102 may provide a variety of applications for allowing a user to accomplish one or more specific tasks. Exemplary applications may include, without limitation, a web browser application (e.g., Internet Explorer®, Mozilla®, Firefox®, Safari®, Opera®, Netscape Navigator®, telephone application (e.g., cellular, VoIP, PTT), networking application, messaging application (e.g., e-mail, IM, SMS, MMS), contacts application, calendar application, word processing application, spreadsheet application, database application, media application (e.g., video player, audio player, multimedia player, digital camera, video camera, media management), location based services (LBS) application, gaming application, and so forth.

In general, an application may provide a user interface (UI) to communicate information to a user, and the mobile device 102 may comprise various components for interacting with the application such as a display for presenting the UI and a keypad for inputting data and/or commands. The mobile device 102 may comprise other components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, a camera, and so forth.

The applications may comprise or be implemented as executable computer program instructions stored on computer-readable storage media such as volatile or non-volatile memory capable of being retrieved and executed by a processor to provide operations for the mobile device 102. The memory also may implement various databases and/or other types of data structures (e.g., arrays, files, tables, records) for storing data for use by the processor and/or other elements of the mobile device 102.

In various embodiments, the mobile device 102 may support position determination capability in addition to and/or in conjunction with other functionality. Examples of position determination capability may include one or more position determination techniques such as Global Positioning System (GPS) techniques, Assisted GPS (AGPS) techniques, hybrid techniques involving GPS or AGPS in conjunction with Cell Global Identity (CGI), Enhanced Forward Link Trilateration (EFLT), Advanced Forward Link Trilateration (AFTL), Time Difference of Arrival (TDOA, Angle of Arrival (AOA), Enhanced Observed Time Difference (EOTD), or Observed Time Difference of Arrival (OTDOA), and/or any other position determination techniques in accordance with the described embodiments.

The mobile device 102 may comprise dedicated hardware circuits or structures, or a combination of dedicated hardware and associated software, to support position determination. For example, the mobile device 102 may comprise GPS receiver or transceiver hardware and one or more associated antennas coupled to a processor to support position determination.

To determine its position, the mobile device 102 may communicate with one or more GPS satellites such as GPS satellite 104. The mobile device 102 may be arranged to acquire and/or decode a satellite signal broadcast by the GPS satellite 104. The signal broadcast by the GPS satellite 104 may comprise, for example, an encoded message frame comprising the current GPS date and time, pseudorandom code data representing an identifier for the GPS satellite 104, ephemeris data representing orbital information for the GPS satellite 104 and for every other satellite in the GPS to calculate the location of the GPS satellite 104, and almanac data representing coarse orbit and status information for each satellite in the GPS, ionospheric information, and GPS-UTC correction information to relate GPS time to UTC.

The mobile device 102 may operate in one or more modes such as in a standalone mode, a mobile station based (MS-based) mode, and/or a mobile station assisted (MS-assisted) mode to determine its position. In a standalone mode (e.g., standalone GPS mode), the mobile device 102 may autonomously determine its position without network interaction or support. In an MS-based mode (e.g., MS-based AGPS mode) or in and MS-assisted mode (e.g., MS-assisted AGPS mode), however, the mobile device 102 may determine its position by communicating with a position determination entity (PDE) such as a location proxy server (LPS) and/or a mobile positioning center (MPC) over a radio access network (RAN) such as a UMTS Terrestrial RAN (UTRAN. In an MS-based mode, the mobile device 102 may determine its position with only limited periodic assistance from the PDE. The PDE may provide information to aid position determination such as satellite-based measurements, terrestrial-based measurements, and/or system-based measurements for improving the speed of satellite acquisition by concentrating the search for a satellite signal. In an MS-assisted mode, the PDE may determine and provide the position to the mobile device 102.

In various implementations, the mobile device 102 may invoke a position fix to determine its current location. To obtain a position fix comprising the coordinates for its location, the mobile device 102 may determine the distance to a plurality of satellites including GPS satellite 104, for example. By locating at least four satellites within view, the mobile device 102 can determine the distance to each of the satellites based on the signal transmission time, the signal reception time, and the speed of each satellite signal. When the distance to at least four satellites is known, the mobile device 102 can calculate a three-dimensional position fix including latitude, longitude, and altitude using triangulation.

A position fix may be invoked by the mobile device 102 in various ways. For example, the mobile device 102 may be arranged to automatically, periodically, and/or autonomously invoke a position fix. In some cases, the mobile device 102 may invoke a position fix in response to a command input by the user. In other cases, a position fix may be invoked in response to input received from a source external to the mobile device 102 such as an external network element or computing device that is attempting to locate the user of the mobile device 102.

A position fix may be invoked by an application on the mobile device 102. In some cases, for example, a position fix may be invoked by application that provides one or more location based services (LBS) such as GPS services, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of services dependent upon the position of the mobile device 102. It can be appreciated that the embodiments are not limited in this regard and that a position fix may be invoked in other ways in accordance with the described embodiments.

In conjunction with determining its position, the mobile device 102 may be configured to detect the presence of various radio frequency (RF) sources within range or view of the mobile device 102. In some cases, the mobile device 102 may detect the presence of the RF sources whenever a position fix is invoked. In other cases, the mobile device 102 may invoke a position fix upon the detection of a RF source.

The RF sources generally may comprise various radio types using different radio modalities and operating in one or more frequency bands or sub-bands. In some cases, the mobile device 102 may establish a communication link with or via an RF source within view. In other cases, the mobile device 102 is made aware of various RF sources with which or through which the mobile device 102 may or may not be able to communicate. Accordingly, the detection of an RF source within view of the mobile device 102 may be independent of whether the mobile device 102 ultimately establishes a communication link to such RF source.

The mobile device 102 may detect the presence of an RF source using various wired and/or wireless interfaces in accordance with the described embodiments. In some implementations, the mobile device 102 may detect the presence of an RF source via a wired interface such as a Universal Serial Bus (USB) connection (e.g., USB host, USB net), Serial Bus Interface (SBI) connection (e.g., FireWire®), or other suitable wired (e.g., tether, plug in) connection the mobile device 102. In other implementations, the mobile device 102 may detect the presence of an RF source via a short range wireless interface (e.g., Bluetooth®, IR). In some implementations, the mobile device 102 may detect the presence of an RF source via a network interface such as a WiFi interface, WiMax interface, Ethernet interface, cellular network (e.g., 1G/2G/3G) interface, or other suitable packet data or switched connection interface in accordance with the described embodiments. Although certain exemplary embodiments may be described as using a particular type of interface, the principles and techniques discussed herein may be implemented any suitable wired and/or wireless media and accompanying technology.

As shown in FIG. 1, one exemplary RF source may comprise a cell tower 106 or other cellular transmission element for broadcasting data within a particular cell or coverage area. In various embodiments, the cell tower 106 may use one or more cellular topologies such as AMPS, CDMA, TDMA, GSM, 3G, Integrated Digital Enhanced Network (iDEN), GPRS, EDGE, HSDPA, UMTS, ixRTT, EV-DO, EV-DV, and so forth.

Another exemplary RF source may comprise a wireless access point (WAP) 108 or other WLAN element for providing wireless network access within a particular area (e.g., hotspot). In various embodiments, the WAP 108 may comprise a Wi-Fi node and/or Wi-Max node implemented by a router or other suitable computing device such as a PC, laptop computer, mobile device (e.g., smart phone, cellular telephone, PDA), and so forth.

Another exemplary RF source may comprise a Bluetooth® node 110 or other WPAN element for providing short-range wireless communication. In various embodiments, the Bluetooth® node 110 may comprise a Bluetooth® enabled device implemented by a PC, laptop computer, mobile device (e.g., smart phones, cellular telephone, PDA), printer, fax machine, digital camera, gaming device, and so forth.

The mobile device 102 may detect various other types of RF signal sources in accordance with the described embodiments represented as RF node 110. Examples of such RF signal sources may include, without limitation, a television (TV) node (e.g., TV tower or network element) such as a UHF, VHF, or Digital Video Broadcasting (DVB) node configured to distribute media content by terrestrial television, cable network, and/or satellite network; a Digital Media Broadcasting (DMB) node such as a DVB for handhelds (DVB-H) node or MediaFlo™ node; a radio node (e.g., radio tower or network element) such as a terrestrial radio (e.g., FM/AM, Ham, trunking) node or satellite radio node; a pager network node or other personal communications device, a beacon such as navigation beacon, an Ultra Wideband (UWB) beacon, or other communications beacon; a satellite node such as a Direct Broadcast Satellite (DBS) node or Fixed Service Satellite (FSS) node; a household device such as a cordless phone; a transponder system such as a Fas-Trak® system or other related highway transponder system, and/or other suitable RF sources.

Upon detecting the RF sources in view, the mobile device 102 may use all of the RF sources (e.g., cell tower 106, WAP 108, Bluetooth® node 110, RF node 112) or a subset of such RF sources as location reference nodes 112. The mobile device 102 then may report position data and node data to a location database 116 within the communications system 100 for associating the position data with the location reference nodes 112. In various embodiments, the location database 116 may comprise a backend database accessible using one or more standard packet methodologies such as GPRS, Ethernet, TCP/IP transport methods, and/or other suitable communications techniques in accordance with the described embodiments. The mobile device 102 may comprise the appropriate network interfaces and a client module (e.g., software) for acquiring and reporting the position data and node data to the location database 116. The mobile device 102 may report such data automatically, periodically, and/or on-demand.

The position data reported to the location database 116 may comprise information specifying the location of the mobile device 102. For example, the position data may comprise the coordinates (e.g., latitude, longitude) and/or other geographic information to provide the location of the mobile device 102. In some cases, the position data may be generated automatically by the mobile device 102 such as when a position fix is invoked. In other cases, the position data may be generated with user input. For example, the mobile device 102 may show a map of the area to the user on a display screen, and the user may select a particular point on the map where the user is located to generate the position data.

The node data reported to the location database 116 may comprise information for identifying one or more of the location reference nodes 114 which are "seen" by the mobile device 102. For example, the node data may comprise a node identifier (ID) (e.g., cell ID, tower ID, Wi-Fi node ID, WiMax node ID, Bluetooth® node ID, TV node ID, radio node ID, etc.), a node name (e.g., SSID, hotspot name), a node address (e.g., MAC address, network address), or other suitable identifying information. The location database 116 may be arranged to correlate the position data with the node data and, as time progresses, the location database 116 is able to determine where various reference nodes 114 (e.g., cell tower 106, WAP 108, Bluetooth® node 110, RF node 112) are located based on the reported position data and node data.

In various embodiments, the location database 116 may be configured to receive and respond to a location query from a mobile device 118 wishing to determine its position. The location database 116 may provide a means for the mobile device 118, in conjunction with a service, to get a quick but coarse fix on its location. The location database 116 may respond to the location query with positioning information based on the correlated position data and node data for providing an estimated position of the mobile device 118. The estimated position can be used by the mobile device 118 as a coarse location for the purposes of finding restaurants, gas stations, and other services which do not require high location precision but need to have low latency.

The mobile device 118 may access the location database 116 using one or more standard packet methodologies such as GPRS, Ethernet, TCP/IP transport methods, and/or other suitable communications techniques in accordance with the described embodiments. The mobile device 118 may comprise the appropriate network interfaces and a client module (e.g., software) for generating and sending location queries and for receiving and interpreting the positioning information from the location database 116.

In various implementations, the location database 116 may allow the mobile device 118 to obtain a course location when GPS capability is unavailable. In some cases, the mobile device 118 may comprise a non-location aware device that does not possess built-in GPS capability. The mobile device 118 may query the location database 116 and receive positioning information for estimating its position without the need for GPS hardware or software. In other cases, the mobile device 118 may possess GPS capability and may send a location query to the location database 116 when its GPS functionality is interrupted such as when being used inside of a large building and/or is otherwise unable to get a position fix.

To obtain its coarse location, the mobile device 118 may detect the presence of various radio frequency (RF) sources (e.g., cell tower 106, WAP 108, Bluetooth® node 110, RF node 112) within range or view of the mobile device 118. The RF sources may comprise various radio types operating in one or more frequency bands or sub-bands. The mobile device 118 may detect the presence of an RF source using any suitable wired and/or wireless interfaces and independently of whether the mobile device 118 establishes a communication link to such RF source.

Upon detecting the RF sources in view, the mobile device 118 may send this information as a location query to location database 116. The location query may comprise, for example, parameters including node data (e.g., node ID, node name, MAC address, etc.) identifying one or more of the location reference nodes 114 and/or any other RF sources which are "seen" by the mobile device 118. In response to the location query, the location database 116 may determine positioning information based on the parameters and return the positioning information to the mobile device 118. Accordingly, the mobile device 118 may obtain course location based on existing RF antenna coordinates.

The mobile device 118 may sending an SSID name (e.g. Joe's Coffee shop) and/or Media Access Control (MAC) address as a probabilistic input to the location database 116 and such information can be correlated, statistically, just by name, as to possible places where the mobile device 118 can be. In some embodiments, MAC addresses or hashed MAC addresses (for privacy concerns) may be recorded. In such embodiments, a MAC by the user may ask the mobile device 118 where it is. The mobile device 118 may show a map of their area to the user on a display screen, and the user may move (e.g., pan-and-zoom) and center the map at a particular point where the user is located. The amount the user moves the map on the screen (e.g., pan-and-zoom moves) may be sent back to the location database 116 for adjustment purposes or to adapt search queries (e.g. which restaurants are closer).

In some embodiments, the mobile device 118 may perform on-device position estimation in response to the positioning information received from the location database 116. For example, the backend location database 116 may return estimated coordinates for the location reference nodes 114 seen by the mobile device 118 which can be used to perform the position calculation on the mobile device 118. This can save server computational time and make the location database 116 more scalable by effectively making the lookups into file-URLs.

In other embodiments, the location database 116 may perform server-side position calculation for the mobile device 118. For example, the location database 116 may take the query parameters, calculate the position, and return positioning information comprising an estimated position used by the mobile device 118 as its coarse location.

In some cases, the mobile device 118 may use successive fixes over a time period to better estimate its position. For example, when a handoff from one cell tower another occurs when a user is walking down a street with the mobile device 116, successive fixes may be used to make better positional estimates. In addition, using successive fixes when switching between different RF sources (e.g., radios, cells, WiFi hotspots, etc.) can allow improved position estimation as well as estimation of speed, traffic density, and so forth.

In some implementations, the mobile device 118 may obtain useful positioning information using tethered cable connection (e.g., USB connection) information and/or short range wireless (e.g., Bluetooth®, IR) connection information. For example, when connected to an RF source in close proximity, the mobile device 118 can use such connection and still get useful positioning information. The mobile device 118 also may obtain positioning information using peer-to-peer discovery in some cases. For example, the mobile device 118 may see a Bluetooth® PAN-ID/beacon of another mobile phone and report such information to the location database 116. Assuming that both devices report to the location database 116, the information can be coordinated to better deduce where both devices are located.

In some implementations, the mobile device 118 may comprise an on-client proxy and one or more browser-based applications comprising scripted programming language. The on-client proxy may be implemented, for example, as a Web Virtual Machine (VM) proxy as described in U.S. patent application Ser. No. 11/612,282 titled "System for Running Web Applications Offline and Providing Access to Native Services," which was filed on Dec. 18, 2006 and/or U.S. patent application Ser. No. 11/873,305 titled "Offline Automated Proxy Cache for Web Applications," which was filed on Oct. 16, 2007.

In such implementations, the on-client proxy (WebVM proxy) may be arranged to inject a cell ID into an http header going to a database. The on-client proxy may then take the database response and inject LBS location information into headers used by web applications to make location information transparently available to browser based applications. Exemplary browser based applications may comprise Basic, Java, and other web applications running scripting languages such as JavaScript, ECMAScript, VBScript, Adobe Macromedia Flash, Java, or other suitable scripted programming. The applications may be authored using the same paradigm that is used to author web sites and accessed by a web browser running locally on the mobile device 118.

In general, the location database 116 may provide positioning information for determining quick but coarse location information. For example, the location database 116 may record position data and node data and respond to location queries with positioning information based on the correlated position data and node data for providing an estimated position of the mobile device 118. While it may be possible for the mobile device 118 to have some coarse knowledge of its position when the location a particular cell tower or Wi-Fi hotspot is known, it can be appreciated that such information generally is only available to the cellular operator or hotspot provider. Using the positioning information from the location database 116, however, works across different types of networks and across cellular operators without the need for explicitly talking to the cellular towers (e.g. only the device's knowledge of the network and cell ID is used) and without requiring assistance from cellular operators.

In addition, using the positioning information from the location database 116 provides better position estimates than using the position estimate of a cell tower or hotspot since the positioning information is based on real world sampling and data which has been calibrated by real GPS devices. Accordingly, using the positioning information can overcome or lessen the effects of multi-path and related radio anomalies such as multi-path distortion, reflections, and uneven cell size.

The described embodiments also provide an autonomous system where only a few devices actually need to know their location with high accuracy and the rest of the devices work cooperatively (via the backend database 116) and without user intervention as RF sources (e.g., towers, hotspots, and other radio nodes) are mapped. The system also works across various radio topologies and may self update over time without user intervention by transparently adapting to and incorporating new radio technologies and modalities as they appear. For example, when the mobile device 102 becomes capable of seeing new types of radio air interfaces, the readings from these new radio types are sent to and represented by the location database 116 as new elements and entries.

Furthermore, it can be appreciated that the positioning information provided by the location database 116 may be self-converging over time and that as more measurements are taken, more accurate positioning information may be provided. The location database 116 may build up and record location reference nodes (e.g., towers, hotspots, etc.) on the fly and continually makes adjustments automatically as new reference nodes are added and deleted. In some cases, coordinates reported may be incorrect or SSID names duplicated. Rather than determine which entries are correct or incorrect, the location database 116 may be configured to perform pattern recognition/statistical analysis (e.g., least squares fit) to weed out these errors.

The location database 116 also may run statistical correlations in real time against the position data (e.g., GPS information) and node data to estimate the position of the location reference nodes 114 as well as the position of the client devices (e.g., mobile device 102, mobile device 118) which may be used as reference points by each other or other devices. In some embodiments, one or more of the location reference nodes 114 (e.g., Wi-Fi hotspot routers, Wi-Max routers) may be configured to report their positions, which devices they are currently seeing, and/or which devices they may have seen.

In general, the location database 116 may maintain positioning information comprising estimated positions of where the location reference nodes 114 and client devices really are and may update the estimated positions whenever a location reference node is used. In some cases, for example, the location database 116 may update the estimated positions of a client device (e.g., mobile device 102) and the location nodes 114 seen by the client device when the client device reports position data and node data associated with the location nodes 114 it sees. In other cases, the location database 116 may update the estimated positions of a client device (e.g., mobile device 118) and the location nodes 114 seen by the client device when the client device requests its location by sending a query identifying the location nodes 114 it sees. It can be appreciated that the location database 116 may simultaneously update the positioning information as new position data and node data is being reported by client devices, while at the same time, the positioning information is being used by client devices to estimate their own positions. By continuously sampling and updating the location database 116, the system may adapt to changing positions and changing node IDs and names.

The location database 116 may be configured to use various statistics and techniques to rate the effectiveness of the positioning information associated with a given client device or location reference node. In various embodiments, the location database 116 may use time decay as to the probability of whether the estimated position of a particular location reference node is reliable or not. For example, the node data reported to the location database 116 may comprise the time when a particular reference node was seen. The location database 116 may comprise or implement a temporal element to age the positioning information or at least account for how stale/recently reported a location to radio ID mapping was made. By using time decay, the location database 116 may maintain time-correlated position information which allows temporal mapping of the location information and for older readings to age/decay out probabilistically or according to aging algorithms.

In general, the probability that the estimated position of a location reference node is effective may depend on the type of radio used. For example, a terrestrial TV tower may have a very high probability of staying in the same place. In contrast, a location reference node such cellular telephone, a laptop computer, or Bluetooth® node may have a high probability of physically moving in a relatively short period of time. For instance, a Bluetooth® node seen at a coffee shop may not persist there for more than a few hours or even minutes. By recording the time when a reference node is seen, the location database 116 may treat the estimated position of a location reference node that is likely to move with less probabilistic weight when the node is seen at a later time (e.g., several days later) than when it is first seen.

In various implementations, the location database 116 may use time derating for a reference point that is likely to move (e.g., WiFi signal from a laptop or cellular phone) but which is seen by a radio needing a position fix at some temporary point in time. The location database may or may not derate the reference point depending on the duration that has elapsed between the time when the reference point was first seen and when it is seen at a later time.

In one example, the mobile device 102 possesses a Wi-Fi radio and determines its position by getting a position fix using GPS or the location database 116. The position of the mobile device 102 is registered in the location database 116 and may be used as a reference point. A short duration (e.g., a few moments) later, the mobile device 118 wants to determine its own position. In this example, the mobile device 118 does not possessing GPS capability but can see the Wi-Fi signal from the mobile device 102. The mobile device 118 uses the mobile device 102 as a reference and sends a location query to the location database 116 identifying the mobile device 102. In response to the location query, the location database 116 may determine that the probability that the mobile device 118 is near the position registered by the mobile device 102 is high since the amount of time elapsed from when the mobile device 102 determined its position and when the mobile device 118 sent the location query is short.

In another example, the mobile device 118 may see a Wi-Fi hotspot previously recorded in the location database 116 and also may see a cell tower. In this example, a long duration has elapsed since the Wi-Fi hotspot was first seen. The mobile device 118 sends a location query to the location database 116 identifying the Wi-Fi hotspot and the cell tower. The location database 116 may look at the estimated location of the Wi-Fi hotspot and the cell tower and determine that it is highly improbable that the mobile device 118 could be seeing both location reference nodes given the last known positions of the Wi-Fi hotspot and the cell tower. At this point, the location database 116 may tag both the Wi-Fi hotspot and the cell tower as being suspicious.

The location database 116 then may ask the mobile device 118 to confirm that it is seeing both the Wi-Fi hotspot and the cell tower in question. If the mobile device 118 confirms that it is, then there is a high probability of one of the following. First, the mobile device 118 may be defective in reporting what it sees. Second, either the Wi-Fi hotspot or the cell ID could have moved. For Hotspots, it is quite possible given SSID duplication and MAC cloning. For cell IDs, it is possible if a micro-cell or similar portable booster is being seen. Third, atmospheric effects may be creating unusual distance receiving.

It is noted that the modeling of the probability of the integrity of a location reference node (e.g. cell tower, hotspot, Bluetooth® node, terrestrial TV, even GPS) is not absolute but is always treated as set of measurements which is reaffirmed with each location fix by a device. Over time, the estimated position of each location reference node will converge to a narrow area or radius where the location reference node is highly probable to be and highly probable to be seen.

The estimated area where a location reference node can be seen will be nonlinear and a function of the type of receiver and may be weighted by the type of receiver seeing the reference node. For example, a first mobile device having a certain make/model may be very good at seeing cell IDs in a certain band, while a second mobile device of a different make/model may be much less sensitive at seeing cell towers in that same band. It follows that the second mobile device may be better at seeing towers broadcasting in a different band than the first mobile device. Accordingly, positioning information may be adjusted based on a certain sensitivity profile for a mobile device indicating how good the mobile device is at seeing certain types of radios.

The sensitivity profile for the mobile device may indicate varying sensitivities for the radios it has depending on its make/model of the device. For example, the sensitivity profile may indicate zero probability for radios it does not have (e.g. a GSM phone cannot see CDMA towers). In some cases, the sensitivity profile may be keyed off of a specification sheet for the mobile device and used to adjust the positioning information for the different radio sensitivities and antenna types used by the mobile device. In other cases, the sensitivity profile may be compiled based on the past success or failure of the mobile to see certain types of radios, and the adjustment of the positioning information may be purely statistical over time.

In various embodiments, the mobile device 102 may report device data to the location database 116 to be recorded when the position data is recorded. The device data may comprise the make/model of the mobile device 102, the signal strength, and/or other device-related information for assisting the location database 114 to determine where the mobile device 102 and the reference node are in relation to each other. Once initial broad fixes of location is known, additional information such as varying sensitivity due to weather conditions and/or the effects of local buildings and interference sources can be used to help lock in on the fix.

All of these types of information can be modeled as a multidimensional Hidden Markov Model (HMM) wherein the observations are the estimated locations and a matrix can be set up of what was seen by a certain device possessing a certain sensitivity profile to each of the radios. Each of these creates a set of observations where each observation is:

> Observation of location node
> $XYZ$=NodeTypeProbability\*ClientSensitivityToThisNodeType\*MutualProbabilityOf_EstimatedRadiusOfNodeTypeAndClientSensitivityToThisBand.

This calculation can be extended to multiple dimensions forming a large probability matrix as is standard for HMMs and which can be calculated in various ways in accordance with the described embodiments.

The calculation can be performed and then updated for each radio and each location node the device sees to provide two sets of outputs. One set of outputs may be the estimated position and error for a client device. For example, the set of outputs may provide a radius of where the client device is within a certain error ZZ %, where ZZ is any number from 0 to 100. It is noted that for a low error (e.g., 1%) the radius will be much larger than for a larger error (e.g., 10%). It is also noted that this can be inverted to indicate the probability of the client device being with YY kilometers.

Another set of outputs may be the updated probability for each location node. For each location node, the probability is updated based on the fact that it was observed by a client device and in which band(s) it was observed and then updated to make corrections to its position estimation and radius of coverage. It is noted that while the term "radius" is used, such area generally is not circular in nature but an irregular polygon shape due to antenna directionality (especially in a given client device) and local interference (e.g., buildings in the way).

Further exemplary embodiments are discussed below. It can be appreciated that any of the features, structures or characteristics described in the context of a particular embodiment are not limited to such embodiment and are not intended to suggest any limitation as to the scope of use or functionality of such embodiment.

Figure 2:
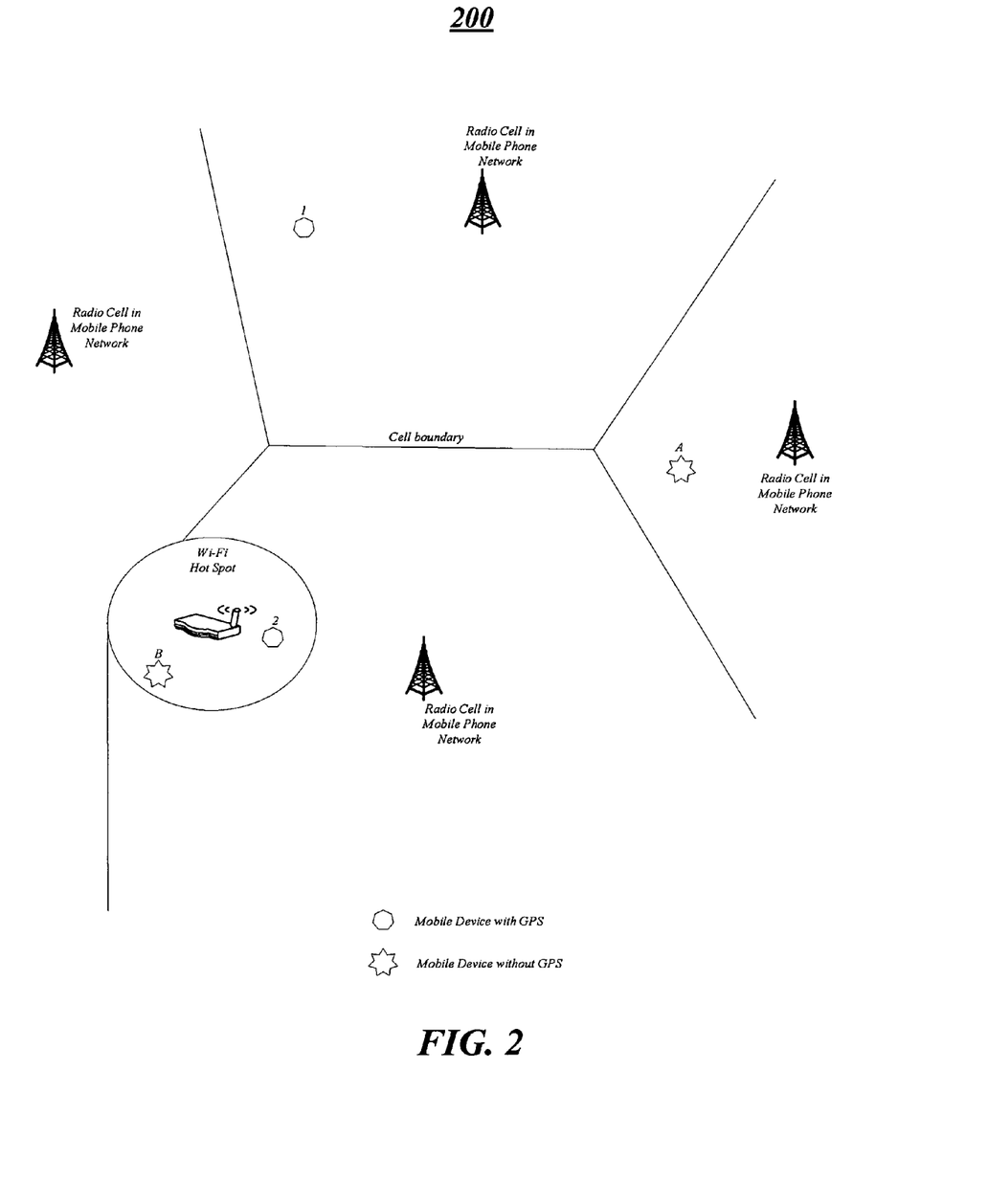
FIG. 2 illustrates one embodiment of a communications system.

FIG. 2 illustrates one embodiment of a communications system 200 comprising various devices some of which are located within cell coverage of a particular radio cell in a mobile phone network and some of which are in cell coverage as well as within the coverage of a Wi-Fi hotspot.

In this embodiment, the devices labeled 1 and 2 are position capable devices (e.g., GPS enabled devices) which report their position and any tower IDs and Wi-Fi node names that they see. The devices labeled 1 and 2 may report such information to a backend database (not shown) which may be implemented as the location database 116 of FIG. 1. The devices labeled A and B are devices which do not possess location ability but can use the backend database to estimate their position. The devices labeled A and B may each send a query to the backend database identifying the particular tower IDs and/or Wi-Fi node names that they see and, in response, receive positioning information from the backend database for estimating their position.

In some implementations, the location of the Wi-Fi hotspot may be deliberately planned in a heavy metropolitan area so that system 200 can self calibrate better. For example, the Wi-Fi hotspot may provide free Wi-Fi access in an airport, and every device which hits the Wi-Fi hotspot helps to calibrate both the position of the device and also helps to adjust the position of the Wi-Fi hot-spot.

Figure 3:
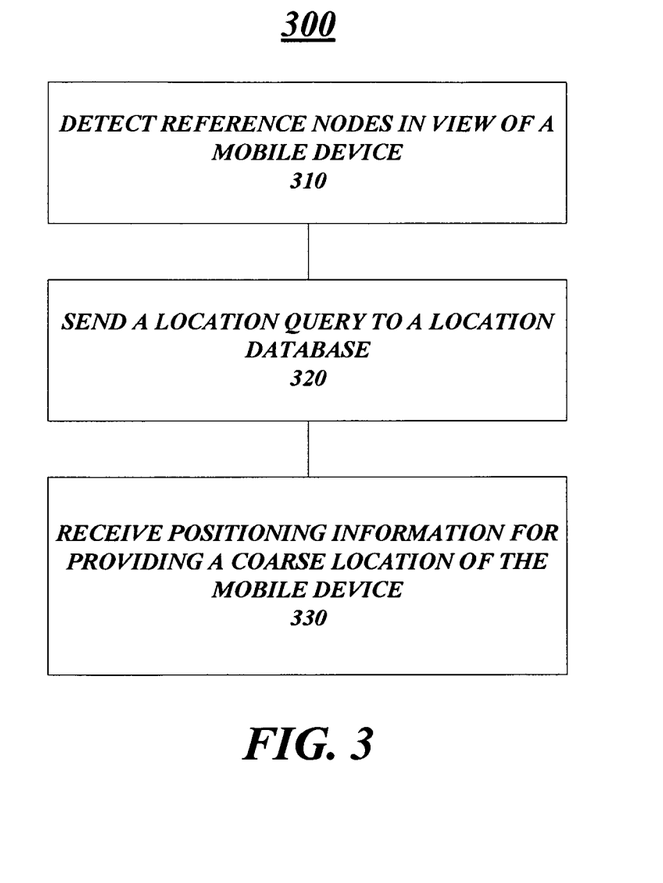
FIG. 3 illustrates one embodiment of a logic flow.

FIG. 3 illustrates one embodiment of a logic diagram 300, which may be representative of the operations executed by one or more embodiments described herein. In this embodiment, the logic diagram 300 may comprise detecting location reference nodes in view of a mobile device (block 310), sending a location query to a location database (block 320), and receiving positioning information from the location database for providing a coarse location of the mobile device (block 330). The location query may comprise node data identifying the reference nodes in view of the mobile device. The positioning information may be based on correlated position data and node data received from one or more client devices having GPS position determination capability and configured to report position data and node data for location reference nodes in view. It can be appreciated that the logic diagram 200 may comprise various other operations in accordance with the described embodiments.

In various embodiments, the logic diagram 300 may comprise, or be implemented as, executable computer program instructions. The executable computer program instructions may be implemented by software, firmware, a module, an application, a program, a widget, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

In various embodiments, the logic diagram 300 may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments. In such embodiments, a computer may include any suitable computer platform, device, system, or the like implemented using any suitable combination of hardware and/or software.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile device comprising:
one or more interfaces for detecting location reference nodes in view of the mobile device; and
a client module to send a location query to a location database, the location query comprising node data identifying the location reference nodes in view of the mobile device,
wherein the client module to receive positioning information for providing a coarse location of the mobile device from the location database in response to the location query, the positioning information based on correlated position data and node data received from one or more client devices having Global Positioning System (GPS) position determination capability and configured to report position data and node data for location reference nodes in view, a probabilistic weight applied to the positioning information based on a type of radio used within each location reference node in view, wherein the mobile device is configured to display a map in response to the positioning information and to accept user input to the map, the user input is sent to the location database for adjusting the positioning information.

2. The mobile device of claim 1, wherein the location reference nodes comprise different types of radio frequency (RF) sources.

3. The mobile device of claim 1, wherein the location reference nodes comprise one or more of a cellular node, a Wi-Fi node, a WiMax node, a television node, a radio node, a pager network node, a beacon, a satellite node, and a household device, and a transponder system.

4. The mobile device of claim 1, wherein the client devices communicate position data and node data periodically.

5. The mobile device of claim 1, wherein the node data comprises a media access control addresses.

6. The mobile device of claim 1, wherein the positioning information comprises estimated coordinates for the location reference nodes in view of the mobile device, and the mobile device determines an estimated position in response to the positioning information.

7. The mobile device of claim 1, wherein the positioning information comprises an estimated position of the mobile device.

8. The mobile device of claim 1, wherein the mobile device sends successive location queries to improve the estimated position.

9. The mobile device of claim 8, wherein the mobile device sends a successive location query in response to switching among location reference nodes.

10. The mobile device of claim 1, wherein the mobile device is connected to a location reference node via at least one of a wired connection, a short range wireless connection, and a peer-to-peer connection.

11. The mobile device of claim 1, further comprising an on-client proxy and one or more browser based applications, the on-client proxy to receive the positioning information from the location database and to inject the positioning location information into headers used by the one or more browser based applications.

12. The mobile device of claim 1, wherein the location database receives position data and node data from one or more location reference nodes configured to identify devices currently and previously seen.

13. The mobile device of claim 1, wherein node data for a new type of location node is incorporated transparently by the location database as a new entry.

14. The mobile device of claim 1, wherein the database adjusts automatically as location reference nodes are added and deleted.

15. The mobile device of claim 1, wherein the location database runs statistical correlations in real time against the position data and node data to estimate positions of the location reference nodes and client devices including the mobile device.

16. The mobile device of claim 1, the location database to update the estimated positions whenever a location reference node is used.

17. The mobile device of claim 16, the location database to update the estimated positions of a client device and the location nodes seen by the client device in response to the client device reporting position data and node data associated with the location nodes it sees.

18. The mobile device of claim 16, the location database to update the estimated positions of the mobile device and the location nodes in view of the mobile device in response to the location query.

19. The mobile device of claim 1, wherein the node data comprises a time when a particular reference node was seen and the location database maintains time-correlated positioning information.

20. The mobile device of claim 1, the location database comprising a temporal element to time decay the positioning information.

21. The mobile device of claim 20, wherein an estimated position for a location reference node that is likely to move is treated with less probabilistic weight when the node is seen at a later time than when it is first seen.

22. The mobile device of claim 1, wherein the positioning information is adjusted based on a profile for the mobile device indicating sensitivity to certain types of radios.

23. The mobile device of claim 1, wherein the positioning information is adjusted based on a model type of the mobile device.

24. The mobile device of claim 1, wherein the positioning information is adjusted based on one or more of signal strength, weather conditions, and effects of interference sources.

25. A method comprising:
detecting location reference nodes in view of a mobile device; and
sending a location query to a location database, the location query comprising node data identifying the reference nodes in view of the mobile device;
receiving positioning information from the location database for providing a coarse location of the mobile device, the positioning information based on correlated position data and node data received from one or more client devices having Global Positioning System (GPS) position determination capability and configured to report position data and node data for location reference nodes in view, wherein a probabilistic weight applied to the positioning information based on a type of radio used within each location reference node in view;
displaying a map in response to the positioning information;
accepting user input to the map; and
sending the user input to the location database for adjusting the positioning information.

26. A computer-readable storage medium comprising executable computer program instructions that when executed enable a computing system to:
- detect location reference nodes in view of a mobile device;
- send a location query to a location database, the location query comprising node data identifying the reference nodes in view of the mobile device;
- receive positioning information from the location database for providing a coarse location of the mobile device, the positioning information based on correlated position data and node data received from one or more client devices having Global Positioning System (GPS) position determination capability and configured to report position data and node data for location reference nodes in view, and a probabilistic weight applied to the positioning information based on a type of radio used within each location reference node in view;
- display a map in response to the positioning information;
- accept user input to the map; and
- send the user input to the location database for adjusting the positioning information.

* * * * *

UNITED STATES PATENT AND TRADEMARK OFFICE
CERTIFICATE OF CORRECTION

PATENT NO. : 8,478,299 B2
APPLICATION NO. : 12/098406
DATED : July 2, 2013
INVENTOR(S) : Manjirnath Chatterjee It is certified that error appears in the above-identified patent and that said Letters Patent is hereby corrected as shown below:

In the Claims

In column 17, line 1, in Claim 26, after "A" insert -- non-transitory --.

Signed and Sealed this
Twenty-fourth Day of September, 2013

Teresa Stanek Rea
*Deputy Director of the United States Patent and Trademark Office*